US005326418A

United States Patent [19]

Yeh

[11] Patent Number: 5,326,418

[45] **Date of Patent: * Jul. 5, 1994**

[54] METHOD OF MAKING POSITIVE-TEMPERATURE-COEFFICIENT THERMISTOR HEATING ELEMENT

[76] Inventor: Yuan-Chang Yeh, No.101, 223 Alley, Sec.1, Tay Pyng Rd., Tsao Twen, Nan Tour, Taiwan

[ * ] Notice: The portion of the term of this patent subsequent to Mar. 9, 2010 has been disclaimed.

[21] Appl. No.: 868,122

[22] Filed: Apr. 14, 1992

[51] Int. Cl.[5] .......................... B32R 7/14; H01C 7/02; H05B 1/02

[52] U.S. Cl. .................................... 156/291; 156/292; 219/505; 338/22 R

[58] Field of Search .................. 156/291, 292; 29/612; 219/505, 544; 338/22 R, 225 D, 327

[56] References Cited

U.S. PATENT DOCUMENTS

| | | | |
|---|---|---|---|
| 4,414,052 | 11/1983 | Habata et al. | 156/273.7 |
| 4,626,309 | 12/1986 | Mullen | 156/292 |
| 4,931,626 | 6/1990 | Shikama | 338/22 R |
| 4,963,716 | 10/1990 | Van Den Elst | 338/22 R |
| 5,057,672 | 10/1991 | Bohlender | 338/22 R |
| 5,077,889 | 1/1992 | Matsuda | 29/612 |
| 5,192,853 | 3/1993 | Yeh | 219/505 |
| 5,198,640 | 3/1993 | Yang | 338/22 R |
| 5,256,857 | 10/1993 | Curhan | 338/22 R |
| 5,270,521 | 12/1993 | Shikama | 219/544 |

FOREIGN PATENT DOCUMENTS

| | | | |
|---|---|---|---|
| 0243077 | 10/1987 | European Pat. Off. . | |
| 0107261 | 5/1987 | Japan . | |
| 2-126586 | 5/1990 | Japan | 219/540 |
| 2076270 | 11/1981 | United Kingdom . | |

*Primary Examiner*—Jeff H. Aftergut
*Assistant Examiner*—Daniel J. Stemmer
*Attorney, Agent, or Firm*—Jacobson, Price, Holman & Stern

[57] ABSTRACT

Method of making positive-temperature-coefficient thermistor (PTCR) heating element involves steps of depositing an insulation adhesive layer having a predetermined pattern on flat surfaces of two heat-radiating means opposite to each other, placing a metal film having a pattern complementary to that of the insulation adhesive layer on uncoated area of flat surface of each of the two heat-radiating means, arranging in sequence a plurality of PTCR pieces on flat surfaces of heat-radiating means, stacking two processed heat-radiating means, with their flat surfaces facing PTCR pieces, applying compressive pressure to the stacked heat-radiating means with PTCR pieces sandwiched therebetween, and allowing insulation adhesive layer to cure under the compressive pressure so that all components are held together intimately and firmly to form a heating element which is cost effective, relatively safe, highly conductive and capable of generating a high and stable thermal output.

2 Claims, 4 Drawing Sheets

METHOD OF MAKING POSITIVE-TEMPERATURE-COEFFICIENT THERMISTOR HEATING ELEMENT

BACKGROUND OF THE INVENTION

The present invention relates to a heat-generating element, and more particularly to a method of making a heat-generating element using thermistor as a heat source.

A method of making positive-temperature-coefficient thermistor (called PTCR for short) element was previously disclosed in the U.S. patent bearing the number of U.S. Pat. No. 4,414,052. The method involves a process of depositing a layer of insulation adhesive on the electrode surface of a PTCR. Thereafter, a perforated metal plate and a metal heat-radiating means are adhered respectively in that order to the coated surface of the PTCR electrode, on which a compressive pressure is exerted so as to force the insulation adhesive to pass through the perforations of the metal plate to spread on the other side of the metal plate and the space between the metal plate and the metal heat-radiating means. The insulation adhesive layer is allowed to cure so as to ensure that the metal plate and the heat-radiating means are held firmly to the PTCR electrode.

Such prior art method as described above has several drawbacks, which are expounded explicitly hereinafter.

As shown in FIG. 15 of the U.S. Pat. No. 4,414,052 cited above, a direct path of electrical conduction is not provided in the PTCR electrode. As a result of presence of a layer of insulation adhesive 54 (55) between the electrode surface 48 of the PTCR and the metal plate 50, the path of electrical current is as follows:

metal heat-radiating means → perforated metal plate → insulation adhesive → PTCR → insulation adhesive → perforated metal plate → metal heat-radiating means

An equivalent circuit of the electrical pathway mentioned above is illustrated as follows:

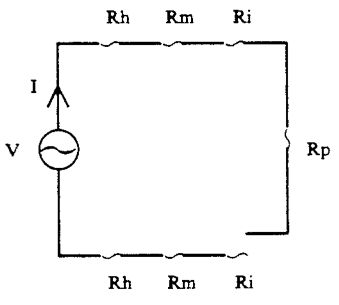

Rh: resistance value of metal heat-radiating means
Rm: resistance value of metal plate
Rp: resistance value of PTCR
Ri: resistance value of insulation adhesive.

According to the circuit principle, the circuit described above has a current $I=V/2R_h+2R_m+2Ri+Rp$, in which the values of $R_h$ and Rm are virtually zero, the value of Ri is indefinitely great. As a result, the current I can be expressed as follows:

$$I=V/\infty \approx 0.$$

In other words, the capacity of the prior art PTCR element for generating thermal output is greatly undermined.

The PTCR element manufactured by the prior art method described above is defective in design in that it is a poor heat conductor in view of the fact that the most of the space between the PTCR and the metal heat-radiating means is covered with the insulation adhesive having a heat-conducting coefficient which is much lower than that of a metal.

In the process of punching the metal plate used for the production of the prior art PTCR element, the metal plate is susceptible to having a hairy line bounding the aperture so punched. Such hairy line is often responsible for enlarging the contact distance between the PTCR and the metal heat-radiating means. In addition, the gap between the PTCR and the metal heat-radiating means is filled with the insulation adhesive, thereby resulting in a reduction in the contact area between the metal heat-radiating means and the metal plate and bringing about poor transmission of electricity and heat through the PTCR, the metal heat-radiating means, and the metal plate. Furthermore, the insulation adhesive is forced to pass through the perforations of the metal plate by means of compressive pressure. Such operation is vulnerable to a risk that the insulation adhesive fails to pass through the perforations successfully due to the poor flowing mobility of the insulation adhesive. As a result of such mishap, the gap between the PTCR and the metal plate is not completely filled with the insulation adhesive, thereby causing sparks and thermal breakdown.

SUMMARY OF THE INVENTION

It is therefore the primary objective of the present invention to provide a method of making a positive-temperature-coefficient thermistor element having a high and stable thermal output.

It is another objective of the present invention to provide a method of making a positive-temperature-coefficient thermistor element whose components are attached together intimately and securely in such a simple manner that they conduct electricity and heat efficiently.

It is still another objective of the present invention to provide a method of making a positive-temperature-coefficient thermistor element having components in close contact so as to prevent the gap discharge or spark from taking place.

It is still another objective of the present invention to provide a method of making a positive-temperature-coefficient thermistor element at a relatively low cost.

In keeping with the principles of the present invention, the foregoing objectives of the present invention are accomplished by a method of making a positive-temperature-coefficient thermistor element, which includes the use of such materials as metal heat-radiating device, metal film, and positive-temperature-coefficient thermistor or "PTCR" for short, and which includes the steps of:

(a) depositing an insulation adhesive layer having a predetermined pattern on the flat surfaces of the two heat-radiating devices opposite to each other;

(b) placing a metal film having a pattern complementary to the pattern of the coating of insulation adhesive, on the uncoated area of the flat surface of each of the two metal heat-radiating devices;
(c) arranging in sequence and in a linear manner a plurality of PTCR pieces on the flat surfaces of the processed metal heat-radiating devices;
(d) stacking two processed metal heat-radiating devices, with their flat surfaces facing the PTCR pieces;
(e) applying a compressive pressure to the stacked metal heat-radiating devices with PTCR pieces sandwiched therebetween; and
(f) allowing the insulation adhesive coating to cure under the compressive pressure of the step (e) so that all components are held together intimately and securely to form a heating element which is cost effective, relatively safe, highly conductive, and capable of generating a high and stable thermal output.

According to a preferred embodiment of the present invention, the insulation adhesive coating having thereon a predetermined pattern is screen-printed on the flat surface of the metal heat-radiating device. Such depositing method is unique in that it saves time and insulation adhesive.

DETAILED DESCRIPTION OF THE PREFERRED EMBODIMENT

Figure 1:
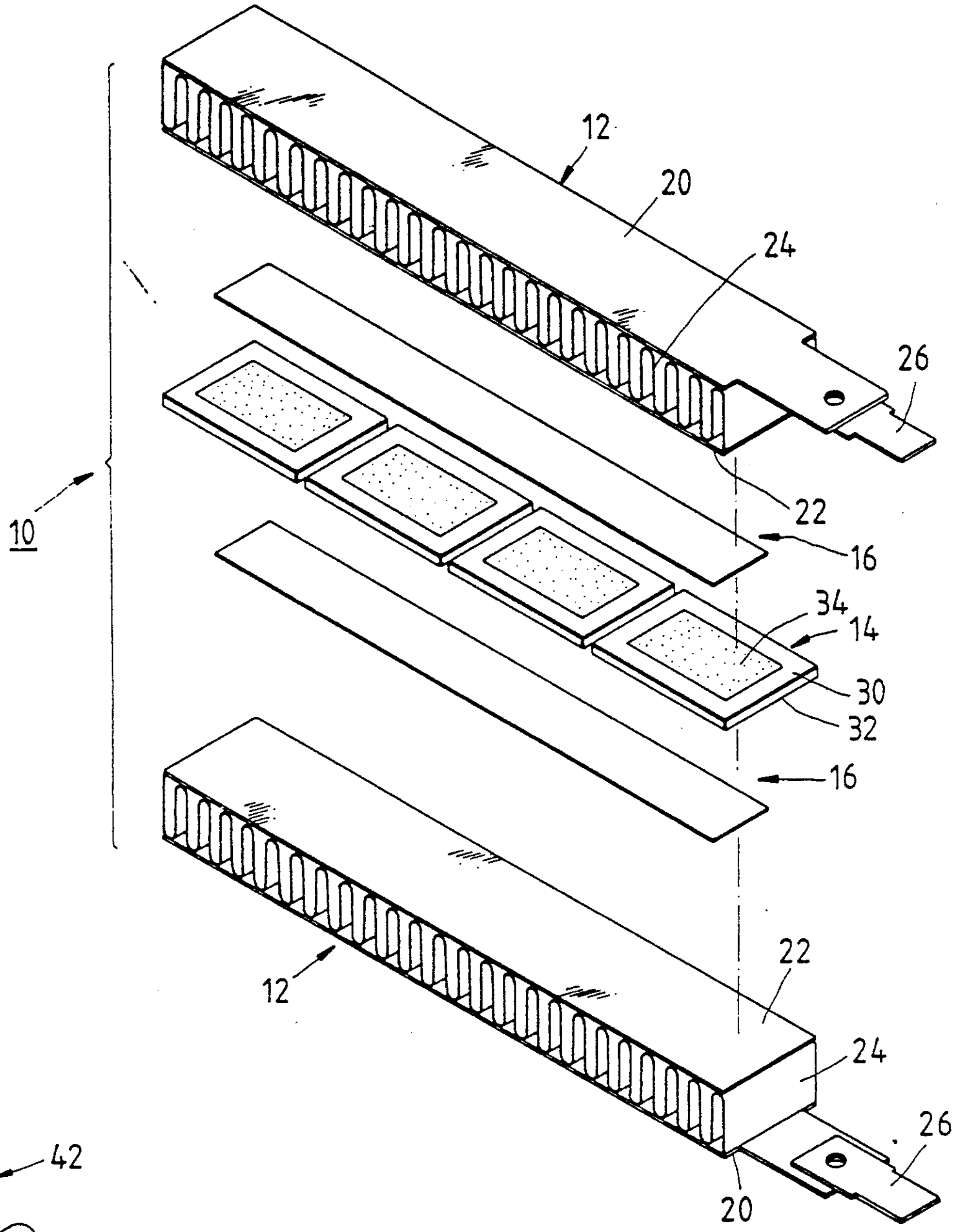
FIG. 1 shows an exploded view of a heating element to be made by a preferred method embodied in the present invention.

Referring to all drawings provided herein, a heating element 10 made by a preferred method of the present invention is shown comprising two metal heat-radiating means 12, four PTCR pieces 14, and two metal films 16.

Each of the two metal heat-radiating means 12 has two parallel metal plates 20 and 22 of rectangular construction. Sandwiched between and attached to the metal plates 20 and 22 is a corrugated metal heat-radiating piece 24. The metal plate 20 is provided at one end thereof with an extended tap end 26 for power source.

Each of the PTCR pieces 14 is provided with two contact surfaces 30 and 32 opposite and parallel to each other. Two metal electrode layers 34 are respectively adhered to the contact surfaces 30 and 32.

The metal film 16 is rectangular in shape, smaller in size than the metal plate 22 and has a thickness that is only one tenth of that of the metal plate 22. In the preferred embodiment of the present invention, the metal film 16 has a thickness of 0.025 mm, while the metal plate 22 has a thickness of 0.25 mm.

Figure 2:
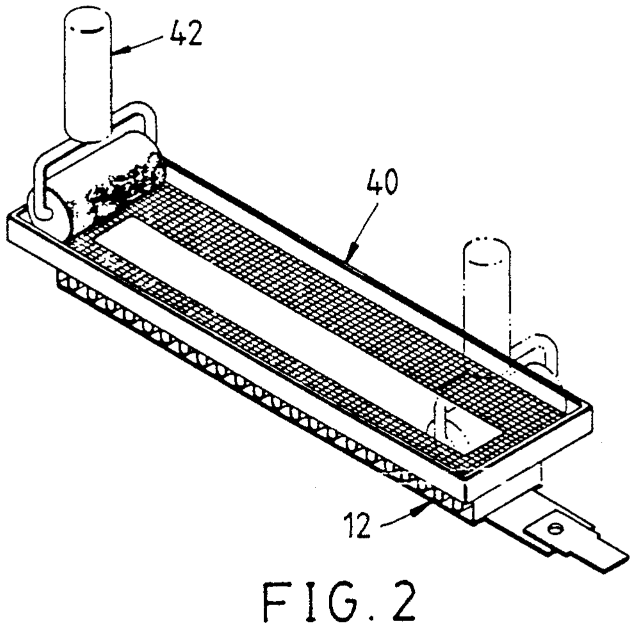
FIG. 2 shows a schematic view of a metal heat-radiating means with its flat surface deposited thereon with insulation adhesive in accordance with the preferred method of the present invention.
Figure 3:
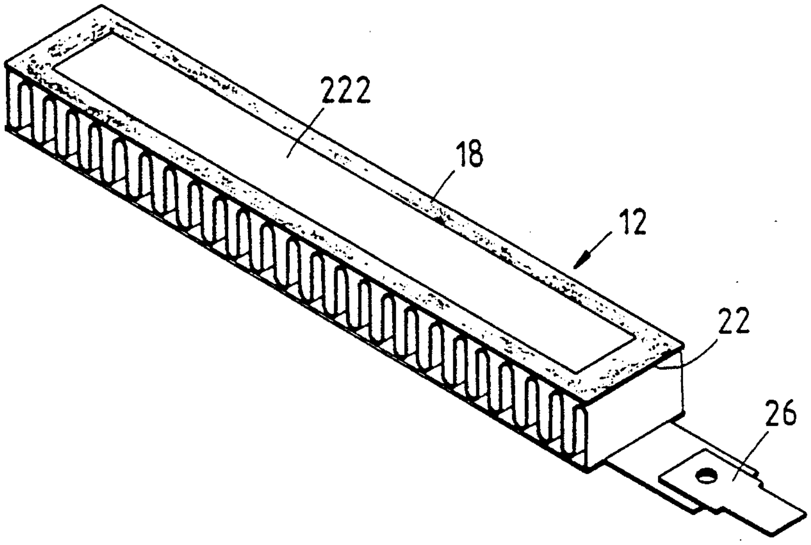
FIG. 3 shows a three-dimensionalview of a metal heat-radiating means with its flat surface deposited thereon with an insulation adhesive layer having thereon a predetermined pattern according to the preferred method of the present invention.
Figure 4:
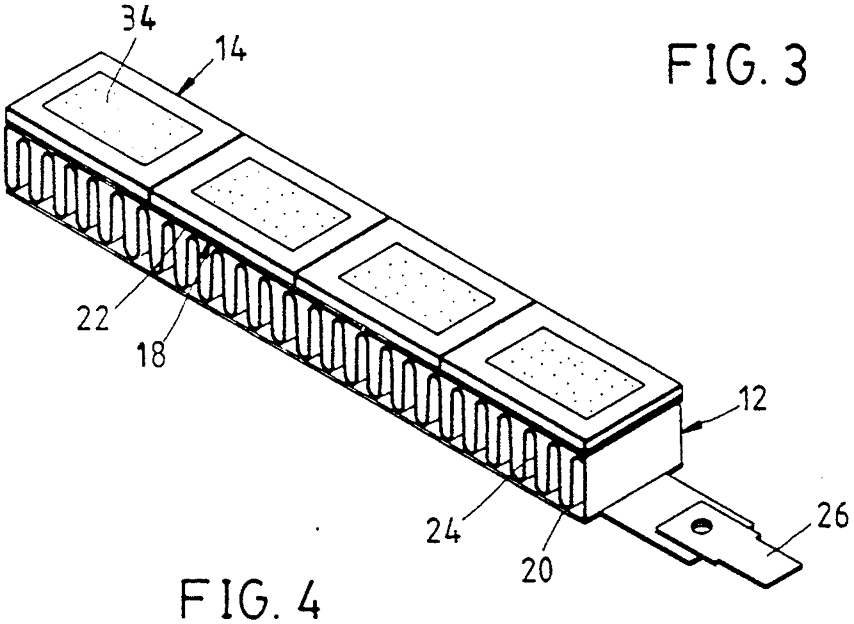
FIG. 4 shows a three-dimensional view of a metal heat-radiating means with its flat surface deposited thereon with PTCR pieces and metal film according to the preferred method of present invention.

Now referring to FIGS. 2 and 3, a preferred method embodied in the present invention is shown including a screen plate 40 and a roller 42 which is coated with insulation adhesive. The marginal area of the flat surface of the metal plate 22 of the metal heat-radiating means 12 is printed with an insulation adhesive layer 18 by means of the screen plate 40 and the roller 42. The printed area of the insulation adhesive layer 18 in its entirety should be rectangular in shape, as shown in FIG. 3. Thereafter, the metal film 16 is placed on a rectangular portion 222 which is not covered with the insulation adhesive. The PTCR pieces 14 are subsequently arranged in sequence and in a linear manner on the insulation adhesive layer 18 and the metal film 16.

The other metal plate 20 of the metal heat-radiating means 12 is treated in the same manner as described above. The metal plates 20 and 22 so treated are stacked.

Figure 5:
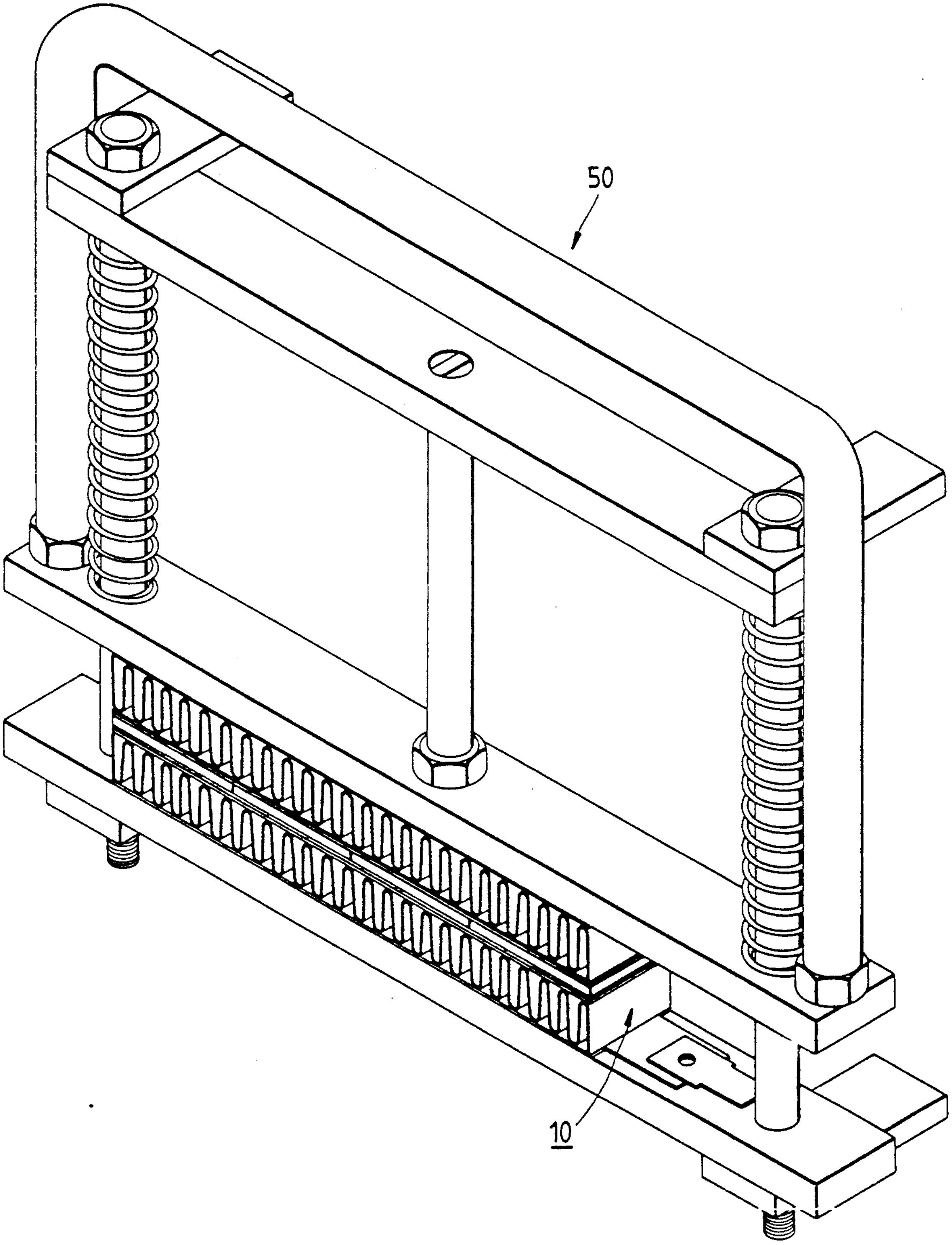
FIG. 5 shows a schematic view of two metal heat-radiating means sandwiching therebetween the PTCR pieces and the metal film and being held by a clamping means according to the preferred method of the present invention.

The other metal plate 20 of the metal heat-radiating means 12 is furnished with an insulation adhesive layer 18 and a metal film 16 in the same manner as described above. The metal plates 20 and 22 are stacked together, with the PTCR pieces 14 and the metal films 16 sandwiched therebetween. A clamping means 50 is used to braced the fresh heating element 10 of the present invention, as shown in FIG. 5.

Figure 6:
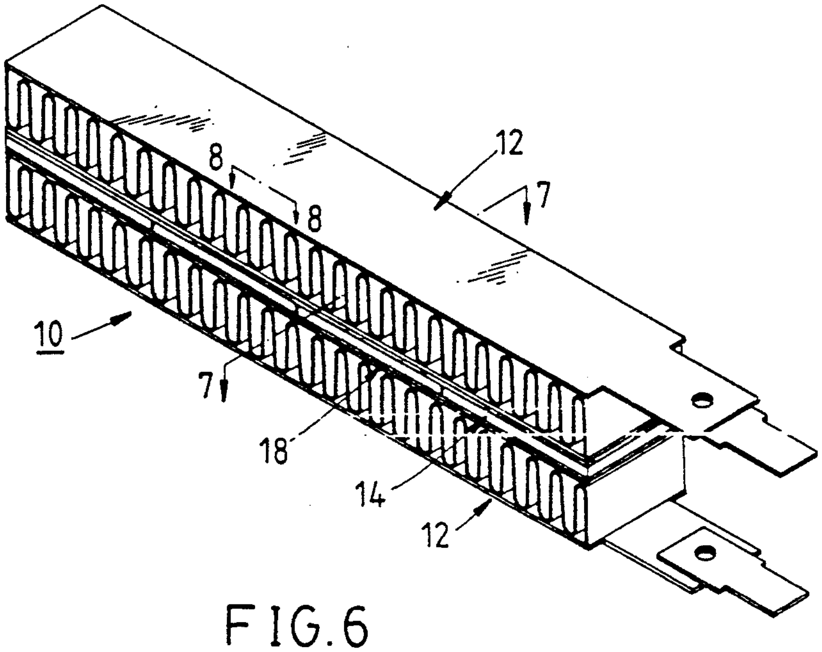
FIG. 6 shows a three-dimensional view of a completed heating element made according to the preferred method of the present invention.

The heating element 10 so made and so braced by a clamping means 50 is sent into an oven (not shown in the drawing), in which it is subjected to baking under the temperature of 280 degrees in Celsius for about 20 minutes so as to allow the insulation adhesive layer 18 to cure under a compressive pressure. As a result, the metal heat-radiating means 12, the metal films 16, and the PTCR pieces 14 are all held together intimately and securely to form an impeccable heating element 10, as shown respectively in FIGS. 6, 7 and 8.

Therefore, advantages of the present invention over the prior art have become apparent and are further explained distinctly hereinafter.

According to the present invention, the insulation adhesive layer 18 is deposited by screen-printing method on the metal plates 20 and 22 in such a manner that it forms a predetermined pattern. Such method of depositing insulation adhesive is unique in that it permits the metal plate to be coated with an insulation adhesive layer having even thickness throughout and that it saves insulation adhesive.

Figure 7:
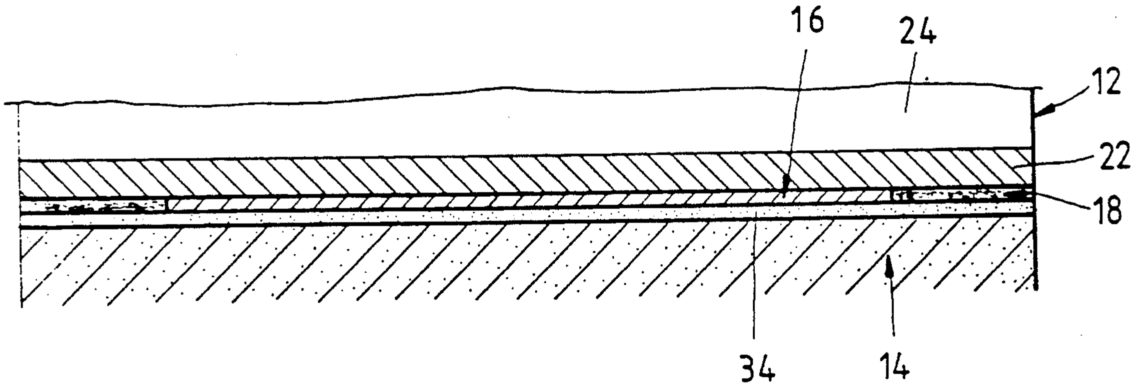
FIG. 7 shows a sectional view of a portion taken along line 7-7 as shown in FIG. 6.
Figure 8:
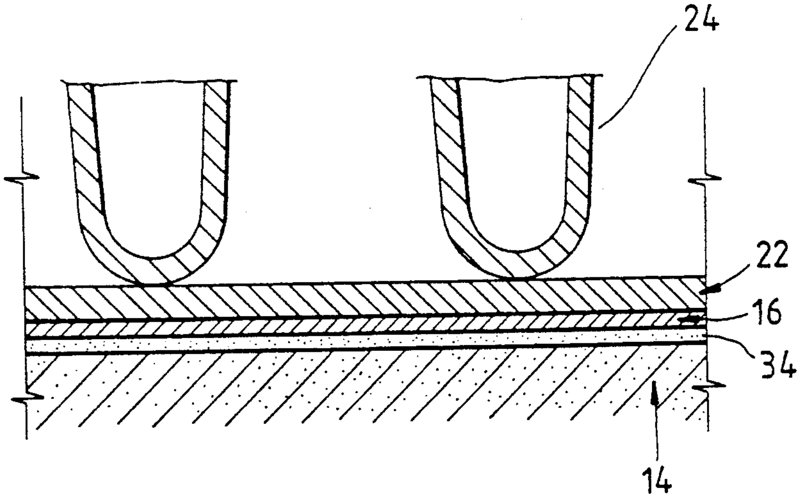
FIG. 8 shows a sectional view of a portion taken along line 8—8 as shown in FIG. 6.

The insulation adhesive layer 18 is subjected to a compressive pressure by the clamping means 50 and is therefore pressed to become as thin as the metal film 16 which has a thickness of 0.025 mm, as shown in FIG. 7. In other words, the distance between each heat-radiating means 12 and each PTCR piece 14 is only 0.025 mm. More importantly, a great portion of the area between the heat-radiating means 12 and the PTCR piece 14 is used for direct conduction of electricity and heat by means of the metal film 16, as shown in FIG. 8. As a result, the heating element 10 of the present invention is superior to the prior art in terms of electrical conductivity and thermal output.

The present invention eliminates the process of punching holes in the metal plate and is therefore free from the problems that are derived from a hairy line bounding the punched hole. Therefore, the present invention affords makers of such heating element a better quality control and is relatively cost effective.

The embodiment of the present invention described above is to be considered in all respects as merely illustrative and not restrictive. Accordingly, the present invention is to be limited only by the scope of the hereinafter appended claims.

What is claimed is:

1. A method of making a positive-temperature-coefficient thermister (PTCR) heating element in which said heating element is made up of a plurality of linearly sequenced PTCR pieces, each of which has a front flat surface and a rear flat surface opposite and parallel to each other, with each surface provided with an electrode layer adhered thereto, said heating element further comprising two metal heat-radiating means used to sandwich said PTCR pieces between flat inner surfaces thereof wherein a metal film and an insulation adhesive layer are disposed between each said electrode layer of said PTCR pieces and each corresponding said inner flat surface of said heat-radiating means, said method characterized by the manufacturing steps of:

(a) coating said insulation adhesive layer having a predetermined pattern on selected portions of said inner flat surfaces of said heat-radiating means opposite to each other;

(b) placing a metal film having a pattern complementary to said pattern of said insulation adhesive layer on only uncoated areas of the inner flat surface of each of said heat-radiating means;

(c) arranging in sequence and in a linear manner a plurality of said PTCR pieces provided with said electrode layers on the insulation adhesive and metal film which have been deposited on the inner flat surface of one of the heat-radiating means;

(d) stacking the other heat-radiating means having the insulation adhesive and metal film deposited on the inner surface thereof on top of the arranged PTCR pieces to form a stack assembly wherein the heat-radiating means sandwich the PTCR pieces, insulation adhesive and metal film between the flat inner surfaces thereof;

(e) applying a compressive pressure to said stacked assembly; and (f) allowing said insulation adhesive layer to cure under said compressive pressure so that said PTCR pieces, said metal heat-radiating means and said metal films are held together intimately and firmly to form said heating element;

wherein the metal film is essentially solid and non-perforated.

2. A method of making a positive-temperature-coefficient thermistor (PTCR) heating element in which said heating element is made up of a plurality of linearly sequenced PTCR pieces, each of which has a front flat surface and a rear flat surface opposite and parallel to each other, with each surface provided with an electrode layer adhered thereto, said heating element further comprising two metal heat-radiating means used to sandwich said PTCR pieces between flat inner surfaces thereof wherein a metal film and an insulation adhesive layer are disposed between each said electrode layer of said PTCR pieces and each corresponding said inner flat surface of said heat-radiating means, said method characterized by the manufacturing steps of:

(a) coating said insulation adhesive layer having a predetermined pattern on selected portions of said inner flat surfaces of said heat-radiating means opposite to each other;

(b) placing a metal film having a pattern complementary to said pattern of said insulation adhesive layer on only uncoated areas of the inner flat surface of each of said heat-radiating means;

(c) arranging in sequence and in a linear manner a plurality of said PTCR pieces provided with said electrode layers on the insulation adhesive and metal film which have been deposited on the inner flat surface of one of the heat-radiating means;

(d) stacking the other heat-radiating means having the insulation adhesive and metal film deposited on the inner surface thereof on top of the arranged PTCR pieces to form a stack assembly wherein the heat-radiating means sandwich the PTCR pieces, insulation adhesive and metal film between the flat inner surfaces thereof;

(e) applying a compressive pressure to said stacked assembly; and (f) allowing said insulation adhesive layer to cure under said compressive pressure so that said PTCR pieces, said metal heat-radiating means and said metal films are held together intimately and firmly to form said heating element;

wherein the insulation adhesive is coated around the periphery of the inner flat surface of the heat radiating means and the metal film is deposited within the insulation.

* * * * *